(12) United States Patent
Brewster et al.

(10) Patent No.: US 7,333,880 B2
(45) Date of Patent: Feb. 19, 2008

(54) AGGREGATION OF DISTRIBUTED ENERGY RESOURCES

(75) Inventors: David B. Brewster, Boston, MA (US); Timothy G. Healy, Boston, MA (US)

(73) Assignee: EnerNOC, Inc., Boston, MA (US)

( * ) Notice: Subject to any disclaimer, the term of this patent is extended or adjusted under 35 U.S.C. 154(b) by 0 days.

(21) Appl. No.: 11/208,029

(22) Filed: Aug. 19, 2005

(65) Prior Publication Data

US 2006/0047369 A1    Mar. 2, 2006

Related U.S. Application Data

(63) Continuation-in-part of application No. 10/314,920, filed on Dec. 9, 2002, now Pat. No. 7,142,949.

(51) Int. Cl.
*H02J 3/00* (2006.01)
*H02J 3/14* (2006.01)

(52) U.S. Cl. .................. 700/286; 700/22; 700/28; 700/295; 700/296

(58) Field of Classification Search ............... 700/22, 700/286, 291, 295, 296, 28, 292; 307/29, 307/31, 35; 705/412; 702/57
See application file for complete search history.

(56) References Cited

U.S. PATENT DOCUMENTS

| | | | |
|---|---|---|---|
| 6,157,874 A | 12/2000 | Cooley et al. | |
| 6,269,287 B1 | 7/2001 | March | |
| 6,522,955 B1 | 2/2003 | Colborn | |
| 6,621,179 B1 * | 9/2003 | Howard | 307/29 |
| 6,625,520 B1 | 9/2003 | Chen et al. | |
| 6,633,823 B2 | 10/2003 | Bartone et al. | |
| 6,691,065 B2 | 2/2004 | Hayashi et al. | |
| 6,785,592 B1 | 8/2004 | Smith et al. | |
| 6,853,930 B2 | 2/2005 | Hayashi et al. | |
| 6,915,185 B2 | 7/2005 | Yamamoto et al. | |
| 7,049,976 B2 * | 5/2006 | Hunt et al. | 702/61 |

(Continued)

FOREIGN PATENT DOCUMENTS

EP    1 263 108 A1    12/2002

(Continued)

OTHER PUBLICATIONS

International Search Report for International Application No. PCT/US2006/031342 dated Dec. 28, 2006.

(Continued)

*Primary Examiner*—Leo Picard
*Assistant Examiner*—Charles Kasenge
(74) *Attorney, Agent, or Firm*—Bromberg & Sunstein, LLP

(57) ABSTRACT

A method and system for controlling distributed energy resources is provided. Notification of an upcoming regional power distribution event is received and a distributed energy resource affected by the upcoming event is determined or identified. A first notification message is sent to an affected distributed energy resource asset owner or other administrator to notify the distributed energy resource asset of the event. An event data process is initiated to monitor and collect data associated with the event and an event control process is initiated to control one or more affected distributed energy resource asset during the event. The event control process and the event data process are terminated at the end of the event.

11 Claims, 5 Drawing Sheets

U.S. PATENT DOCUMENTS

| | | |
|---|---|---|
| 2002/0138176 A1 | 9/2002 | Davis et al. |
| 2003/0074244 A1 | 4/2003 | Braxton |
| 2003/0193405 A1* | 10/2003 | Hunt et al. .................. 705/412 |
| 2004/0117330 A1 | 6/2004 | Ehlers et al. |

FOREIGN PATENT DOCUMENTS

| | | |
|---|---|---|
| EP | 1 367 689 A2 | 12/2003 |
| WO | 01/006612 A1 | 1/2001 |
| WO | 01/061820 A1 | 8/2001 |
| WO | 01/071881 A2 | 9/2001 |
| WO | 01/098851 A1 | 12/2001 |
| WO | 02/015365 A2 | 2/2002 |
| WO | 03/056681 A1 | 7/2003 |
| WO | 03/084022 A1 | 10/2003 |

OTHER PUBLICATIONS

Sonderegger, Robert C. "Distributed Generation Architecture and Control", E-Vision 2000 Conference, Online 2000, pp. 292-301.

* cited by examiner

AGGREGATION OF DISTRIBUTED ENERGY RESOURCES

This application is a continuation in part of U.S. patent application Ser. No. 10/314,920, filed Dec. 9, 2002, now U.S. Pat. No. 7,142,949 which provides priority for this application and which is incorporated herein by reference.

FIELD OF THE INVENTION

The invention generally relates to generation and consumption of electric power, and specifically, to aggregation of distributed energy resources.

BACKGROUND ART

Businesses and industry continue to require and consume increased amounts of electric power. One reflection of this trend is growing interest in self-generation of electric power, either to replace or to supplement that delivered by load-serving entities and utilities over the existing electric power distribution grid. Distributed energy resources (DER) are power generation technologies and demand reduction technologies located close to where electricity is used (e.g., a home or business) to provide an alternative to or an enhancement of the traditional electric power system.

The employment of small-scale power generation capability at a local commercial or industrial facility has become known as distributed generation (DG). Most owners and operators of DG systems lack sophisticated controls and functional software to optimize the performance of their systems. This usually results in under-utilization of DG assets and unfavorable economics for DG projects. In addition, most end-users of electric power do not want to become experts in microgeneration. While the number of DG assets increases, much of these sit idle, and owners lack the capability to access wholesale power markets or sell this excess generation capacity back to the electric power distribution grid.

Most commercial and industrial facilities also have the capability to temporarily reduce their demand for electric power from the electric power distribution grid either in response to local operating conditions or external conditions of the electric power distribution grid. Most facilities lack sophisticated controls and functional software to optimize the employment of temporary demand reduction systems or capabilities and to record this activity for historical tracking purposes and credit in wholesale power markets. This usually results in an underutilization of demand reduction systems or capabilities and unfavorable economics for such projects. While new "smart" appliances and other enabling technologies have become more common, much of this capacity sits idle, and owners lack the capability to access wholesale power markets or sell temporary demand reduction back to the electric power distribution grid.

SUMMARY OF THE INVENTION

A representative embodiment of the present invention includes a method and system associated with controlling electric power (which may include reducing demand of electric power from an electric power distribution grid, either through distributed generation or actual demand reduction systems or capabilities (collectively distributed energy resources). Power demand data and power supply data may be monitored over time and analyzed to coordinate control of at least one distributed energy resource. In accordance with one embodiment, notification of an upcoming regional power distribution event is received and a distributed energy resource affected by the upcoming event is determined or identified. A first notification message is sent to an affected distributed energy resource asset owner or other administrator to notify the distributed energy resource asset of the event. An event data process is initiated to monitor and collect data associated with the event and an event control process is initiated to control one or more affected distributed energy resource asset during the event. The event control process and the event data process are terminated at the end of the event.

DETAILED DESCRIPTION OF SPECIFIC EMBODIMENTS

The present invention is directed to the remote management and control of distributed energy resources (DERs) including monitoring, alarming, control, aggregation, billing, data management, and reporting. Embodiments of the invention provide generation control and building energy management and control systems that are optimized for peak shaving and demand response activities, and which facilitate automation of various load curtailment-related strategies at the end-use level. Multiple distributed generation (DG) and other DER assets are networked in real-time within a single user interface for optimal control and verification. This creates an enabling technology system for facilitating customer or end-user participation in day-ahead or real-time electric power markets, and optimized utilization of DER assets.

More specifically, embodiments of the invention enable end-use electric power consumers and networked third parties to optimally aggregate and control DG and other DER assets. An economic optimization engine formulates advanced control strategies for DER assets. In one embodiment, the optimization engine periodically determines various decision rules such as optimal control thresholds for minimizing demand charges (peak shaving) and optimal operating periods to access existing wholesale and other market opportunities. Extensive historical and real-time data are provided to the optimization engine, including, for example, building energy use, fuel costs, asset operation and maintenance costs, local and regional operating constraints (noise, other emission restrictions), weather data, existing service and rate contracts, and electric power distribution grid conditions. The resulting system allows for management and control of required load and DG equipment in response to facility conditions or electric grid conditions, including retail and wholesale market prices.

Figure 1:
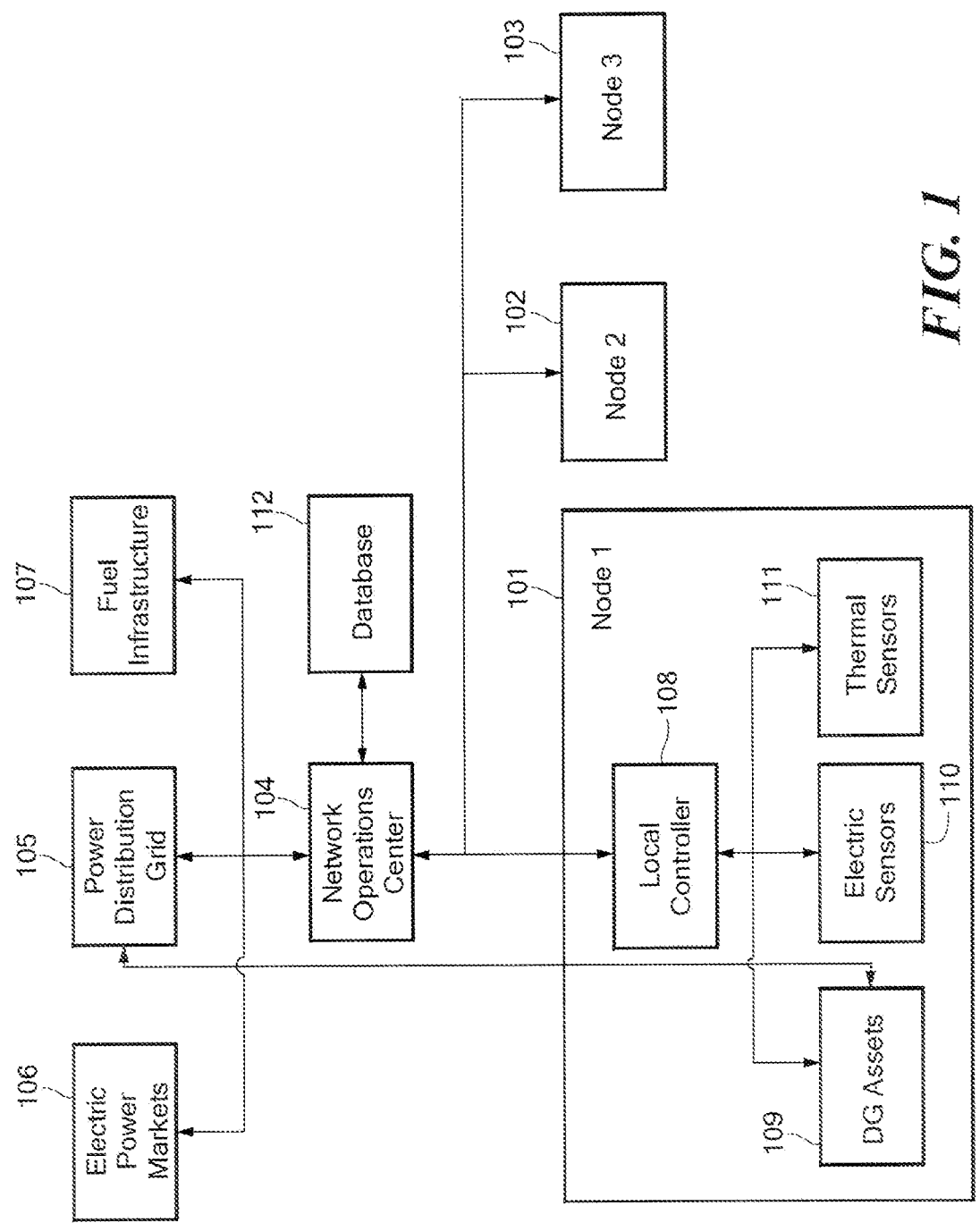
FIG. 1 is a functional block diagram of one specific embodiment of the present invention.

FIG. 1 shows a functional block diagram of one specific embodiment of the present invention. Multiple DER asset nodes 101-103 are in communication with and monitored by a network operations center (NOC) 104. The NOC 104 is also in communication with the actual electric power distribution grid 105, and the grid owners and operators (generally an Independent System Operator (ISO), Regional Transmission Organization (RTO), or Distribution Company (Disco)) denoted as electric power markets 106, and a fuel infrastructure 107 that provides fuel for DER assets, as appropriate. Optimally, there might be one NOC 104 per major power market. The NOC 104 also maintains and utilizes a database 112 of information gathered from the various blocks it communicates with.

Within each DER node 101–103 is a microprocessor-controlled local controller 108 is in communication with the NOC 104. The local controller 108 may include serial port, wireless, and/or Ethernet connection capability. For example, in one embodiment, the local controller 108 translates incoming communications in use at the DER node in various protocols such as RS232, RS485, Modbus, LON-Works, etc. into a specified communications protocol such as Ethernet. In some embodiments, the local controller 108 uses wireless communications to communicate with the NOC 104 and other equipment within the DER node. In some embodiments, multiple communications channels are maintained such that they are available for communications between the NOC 104 and each node 101–103, and within each node. Such multiple channels facilitate more timely and effective responses than telephone-only approaches previously relied upon.

The local controller 108 controls and co-ordinates the operation of the DER assets 109 including transfer switches, generators, air handlers, compressors, pumps, temperature control units, and lighting control units, various electric sensors 110 (meters) associated with the DER assets and the physical plant serviced by the DER assets, as well as various thermal sensors 111 associated with the DER assets and the physical plant serviced by the DER assets. In other words, the local controller 108 determines whether and when to dispatch the DER assets 109 that it controls according to the various decision rules received and stored from the NOC 104. In some embodiments, the control of the DER assets 109 by the local controller 108 is complete and automatic, while in other embodiments, the process can be controlled by a human facility manager, who simply needs to respond to or ignore the recommended action of the local controller 108.

The electric sensors 110 and thermal sensors 111 may be, for example, commercially available "smart meters" to meter and monitor facility thermal and electrical loads, i.e., industrially-hardened devices that enable real-time, continuous, and accurate remote monitoring of electric and thermal characteristics of interest. To provide operating data to the local controller 108, older DER assets may also require external "smart meters" similar to the meters used for facility loads, while newer DER assets generally already have such data available at a communications port.

The facility and DER asset data generated by the sensors typically are sent in real-time to the local controller 108 where it is generally stored at the node for later transfer to the NOC 104 and its database 112. This data includes DER asset operating information, and facility load data such as real-time and historical electric and thermal load data. Typically, the NOC 104 automatically uploads this data at regular intervals, for example once a week, for storage in the centralized database 112. In addition, the sensor data may be uploaded responsive to a polling query from the NOC 104.

The NOC 104 together with the local controller 108 at each node 101–103 form a system of distributed intelligence that represents a shift from previous centralized or non-existent intelligence models designed for the management of DER assets at end-use customer facilities. Each local controller 108 possesses enough intelligence to process the information it receives in order to determine whether or not to dispatch the DER assets 109 that it controls based on the various decision rules it has received from the NOC 104. This distributed intelligence system also provides redundant data collection, information storage, and basic microprocessing capability.

The NOC 104 contains the core system software: the more rigorous and complicated optimization engine that formulates the decision rules that carry out the facility-specific and network control strategies. The NOC 104 uses the data gathered from the various other blocks in the network and stored in its database to determine threshold controls for controlling the DER assets 109 at the various nodes. A threshold command may be, for example, a simple on/off command, which tells a generator to operate to keep peak kilowatt (kW) demand from exceeding a pre-set value. Such threshold commands may be updated at various intervals and may control the DER assets 109 in blocks of time. For example, one specific embodiment sets hourly thresholds once per week, for the entire week, for each DER asset 109 in the network.

The threshold setting described above is inherently difficult. Among other things, conventional rate structures are based on both consumption charges and peak demand charges over a billing period, which makes calculation of instantaneous "next kWh" costs difficult. Specific embodiments use a NOC algorithm that utilizes the information in the database 112 (including facility load profiles, DER asset operating characteristics, grid conditions, weather, utility rates, and other signals from within customers' facilities and from external sources) in a series of parametric calculations to determine exactly when to trigger DER asset operation for each period of the billing cycle (e.g., per quarter hour or hourly). The goal of such an algorithm is to minimize a facility's overall energy costs by identifying optimal tradeoffs. Artificial intelligence (genetic algorithms and fuzzy logic) can enable the NOC algorithm to get better at predicting facility loads, becoming "smarter" over time and continually increasing its usefulness.

Once the NOC 104 calculates the threshold controls for an upcoming period of time, such as the next week, these may be sent via a communications network, such as the Internet or wireless system to the local controllers 108 at each node. The threshold controls are stored in the local controllers 108 and automatically trigger DER asset operation based on readings from the site's electric and thermal meters 110 and 111 or external market signals. In some embodiments, the NOC 104 and/or the individual DER nodes 101–103 may have the ability to override these transmitted commands in real-time in response to grid conditions, operating constraints, and other signals. Control of the DER assets 109 by the NOC 104 requires development of command and control software for each specific DER asset make/model. Such commands are communicated via public networks (e.g., the Internet) or wireless networks to the local controllers 108 at each node, and subsequently to the DER assets 109 via serial port connections (newer DER assets), dry-contact relay (older DER assets), or wireless communications systems. The NOC 104 also determines and communicates real-time commands to the DER nodes to take advantage of load curtailment and grid sellback opportunities.

Typically, the NOC 104 provides network oversight and management of DER assets 24 hours a day, seven days a week. The NOC 104 stores and retrieves data from customer sites and external sources in its database 112. Facility and key DER asset operating data are communicated periodically, for example, every 15 minutes or less, while optimal control thresholds and other signals are broadcast over the network to multiple DER nodes.

Embodiments are adaptable to different DER assets, facility characteristics, rate structures, and control strategies. The optimization engine is based on neural networks and genetic algorithms possessing artificial intelligence that continually learns more about a facility's consumption patterns, DER asset performance, and market opportunities. Over time, the system evolves into greater efficiency and effectiveness at predicting facility loads. The resulting system is an enabling technology with a Web-based component that serves as an energy information tool to facilitate decision-making through real-time access to load data, baseline data, historical data, and market activity.

Moreover, while each individual node may be administered and controlled by the NOC 104 independently of other nodes, in other embodiments, the NOC 104 may coordinate the management of multiple nodes to obtain further benefits. For example, the production capacity and fuel sources of multiple nodes can be taken into account in determining optimal control thresholds, and excess DG capacity when a given DG asset is operating may be made available to other nodes, depending on specific circumstances including specifics of the relevant electric power distribution infrastructure.

Figure 2:
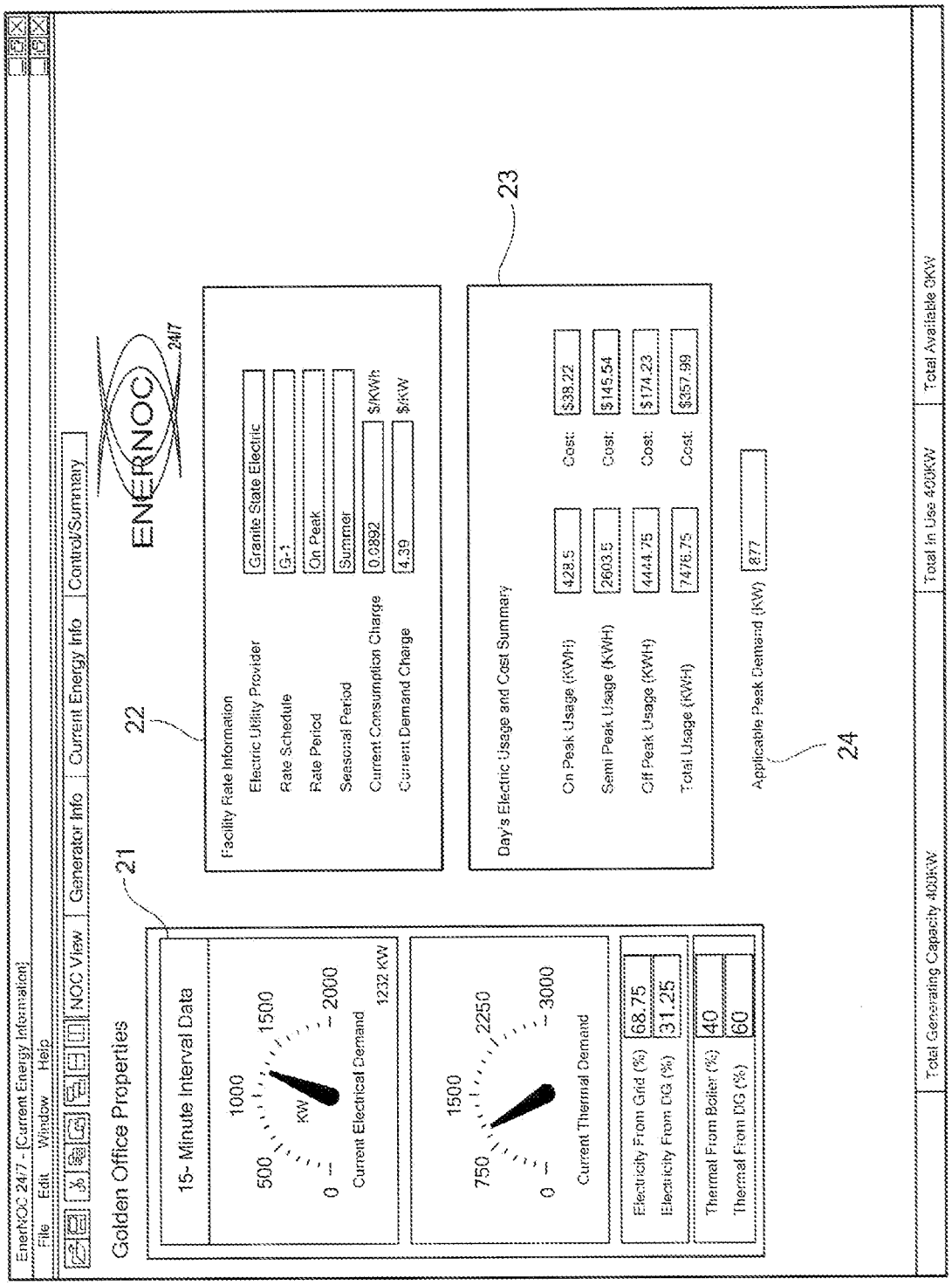
FIG. 2 is a screen shot of one embodiment showing a display of real-time and historical distributed generation system information.
Figure 3:
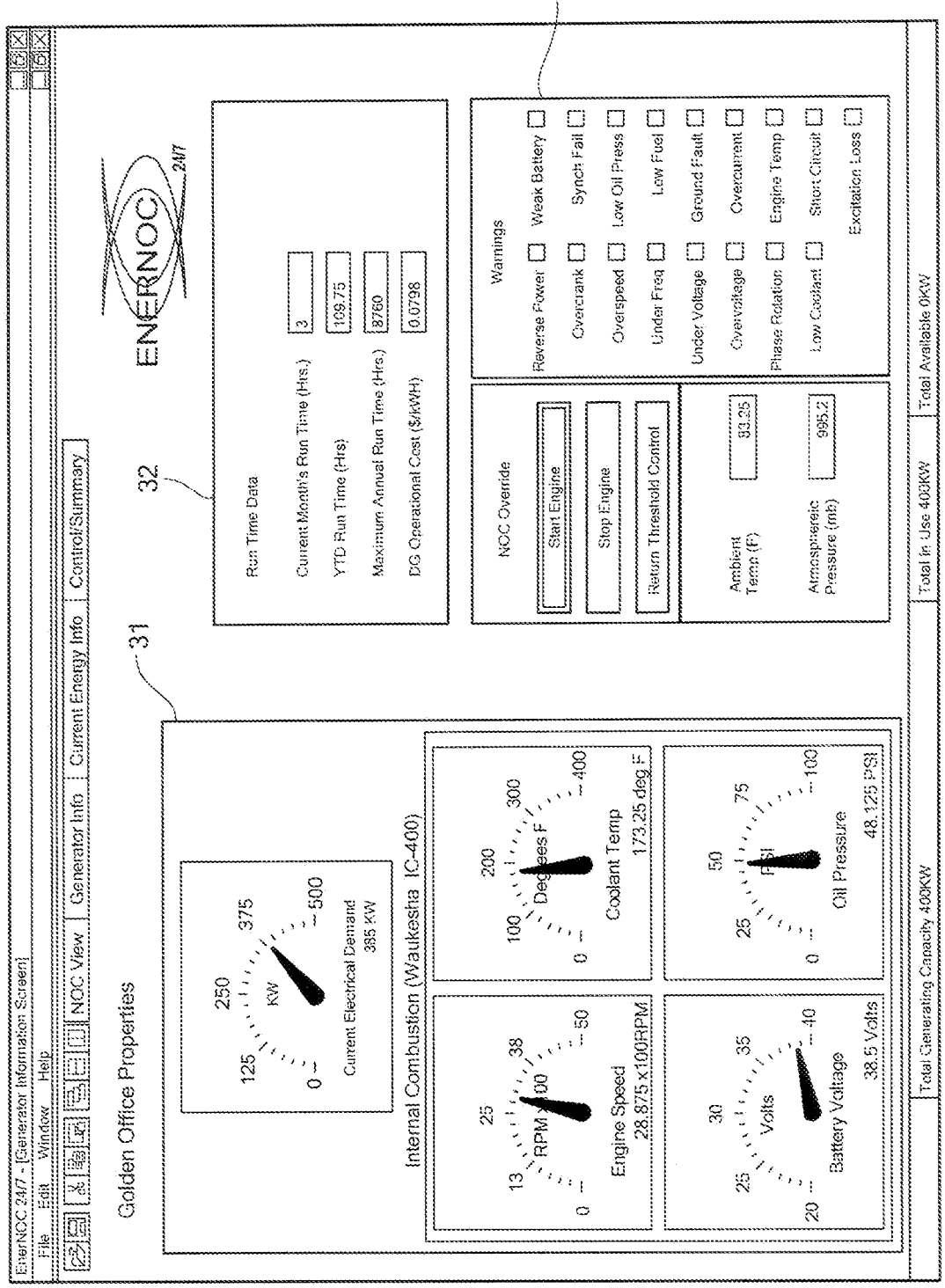
FIG. 3 is another screen shot of an embodiment showing a display of current and historical facility-specific energy consumption data.

The various data gathered by the NOC 104 from each local controller 108 may be usefully presented in one or more user interfaces, such as those shown in FIGS. 2 and 3. FIG. 2 allows monitoring of facility energy demand and consumption, including, for example, a 15-minute interval data 21 that includes overall electric demand, overall thermal demand, percent electricity from the grid and from the DG assets, and percent useful heat from the site boiler and from the DG assets. A facility rate information section 22 identifies the specific electric utility provider, rate schedule, rate period, seasonal period, current consumption charge rate, and current demand charge rate. A day's usage and cost section 23 summarizes on-peak usage and cost, semi-peak usage and cost, off-peak usage and cost, and total usage and cost. Applicable peak demand 24 may also be displayed.

FIG. 3 shows an interface for continuously monitoring and recording interval data from each DER asset. A DG equipment meters section 31 provides displays of DG parameters such as battery voltage, oil pressure, engine speed, coolant temperature, and power output. This section or a similar one could also be used to display fuel level, ambient temperature, and atmospheric pressure, or lighting levels and compressor operting status. The process of configuring meters to read key operating parameters from older DER assets requires customization and a slightly different approach for each DER asset make/model. Newer DER assets are capable of transmitting key operating parameters via serial port or Ethernet. A run-time data section 32 displays the current month's run-time, year-to-date run-time, maximum annual run-time, and DER asset operations cost rate. Out-of-tolerance alarms 33 can be displayed as a warning light indication for various DER asset failure modes and conditions, and these alarms can further be set to trigger pager and email alarms.

Figure 4:
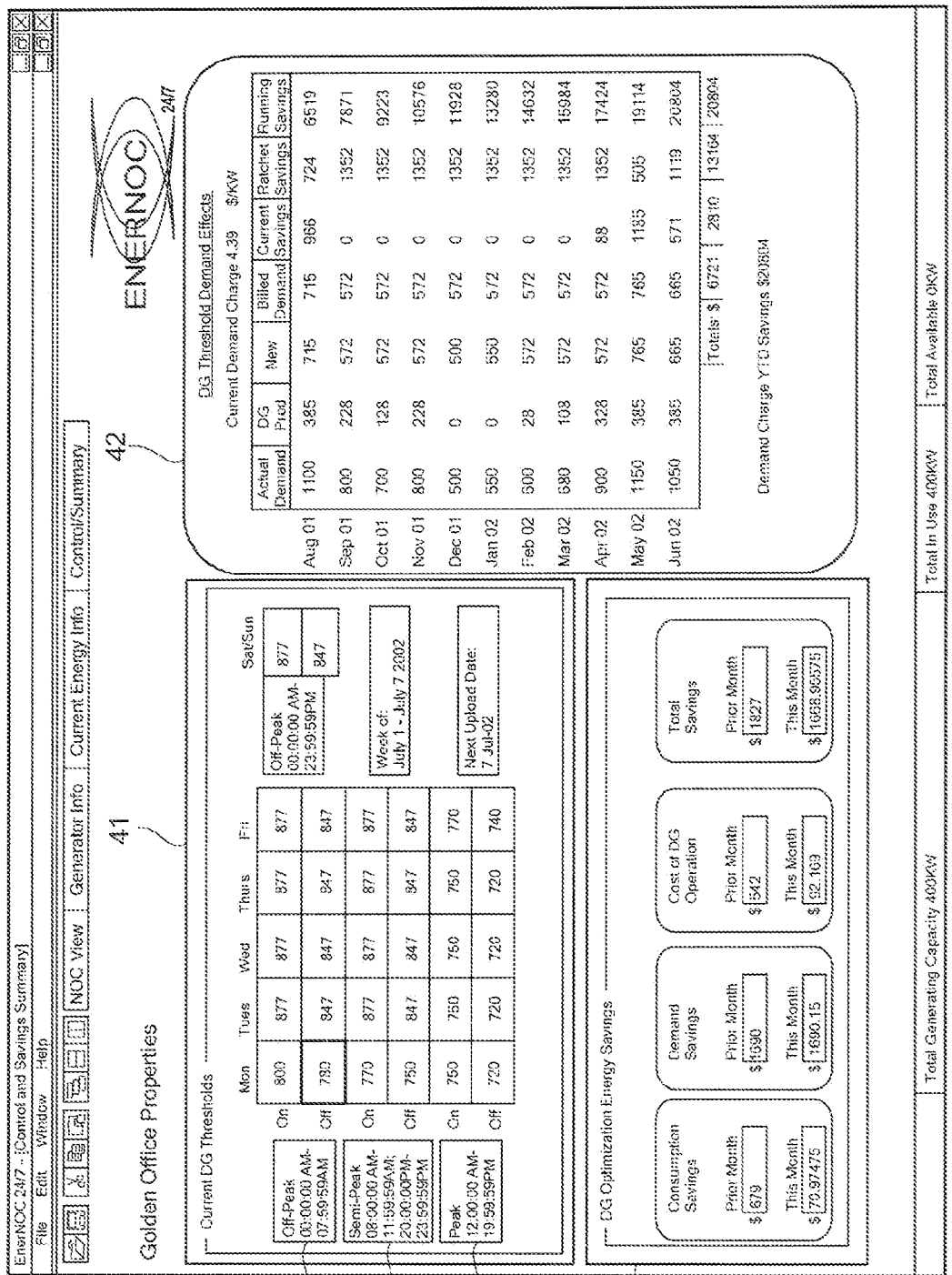
FIG. 4 is another screen shot of an embodiment showing a display of real-time and historical energy savings data.

FIG. 4 shows an example of one user interface report presented to show the current DG operating plan in combination with reporting of the effects of the DG optimization achieved by a specific embodiment of the invention. A current thresholds section 41 has an off-peak row 411, a semi-peak row 412, and a peak row 413. Each row corresponds to a different utility supply rate structure period, the exact times for which may also be displayed as shown in FIG. 4. For each rate row 411–413, the optimized on/off power demand thresholds are displayed as determined by the NOC 104. When power demand on a given day at the local DG node reaches the predetermined on-threshold, the local DG asset 109 at that node will commence operating and supplying power to the node in excess of the threshold, until power demand falls below the off-threshold, at which point the local DG asset 109 ceases operating.

The user interface report in FIG. 4 also has a thresholds demand effects section 42 that shows the accumulated effects of such optimized operation of DG assets 109 in terms of total power consumption, power supplied by the DG asset 109 vs. power consumed from the power distribution grid 105, and resulting savings. An optimization energy savings section 43 provides further detail regarding the current savings attributable to the optimized DG operation.

Figure 5:
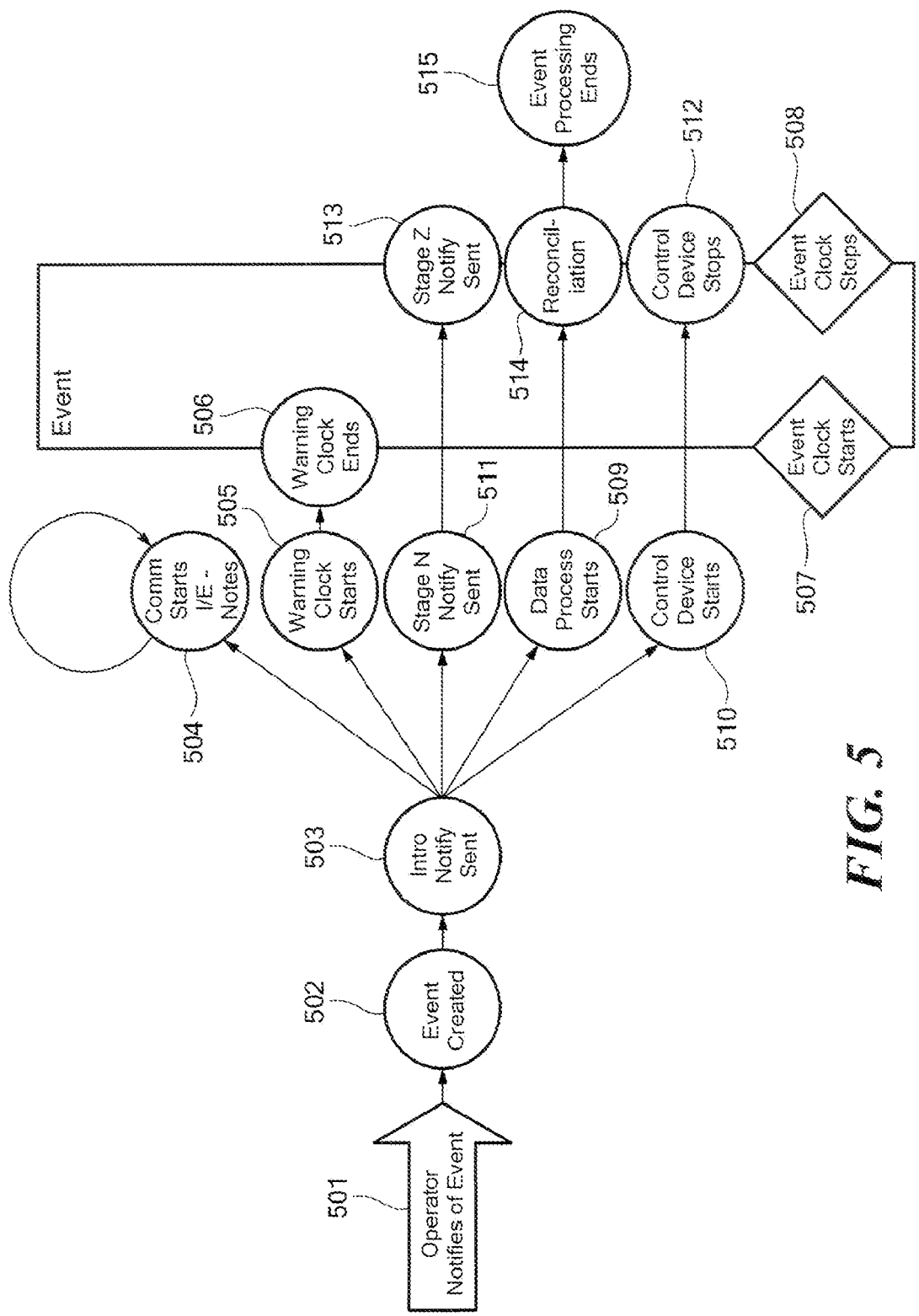
FIG. 5 illustrates one specific algorithm for controlling distributed energy resources according to embodiments of the present invention.

An embodiment may be based on a relatively detailed and specific algorithm such as the one illustrated by FIG. 5, which shows a fully automated system for using DER assets to manage a provider-requested energy assistance or demand response event. Initially, the power grid operator notifies the NOC 501 of an upcoming event such as a request to temporarily reduce the demand of electric power from the electric power distribution grid for a specified program, time, and geographical region. The term "specified program" refers to DER asset owners who have subscribed to participate with the NOC and power grid to utilize their DER assets according to a predefined agreement. So, in step 501, identifying the specific program involved helps determine which DER assets will be available to respond to the event. FIG. 5 shows a more or less fully automated cycle, but other embodiments could benefit from a partially automated/partially manual approach.

The NOC receives the event notification signal, parses the message and creates a corresponding event 502, determines which DER assets are potentially affected, and sends a generic introductory notification message 503 to the owners (or other administrators, controllers or operators) associated with these assets (via e-mail and/or SMS). This may also involve providing the notification message to a NOC management team along with contact information associated with the affected owners of the DER assets.

The NOC event notification message 503 triggers multiple actions. After the generic introductory notification message is sent to those affected owners, a second custom event message 504 may be sent to each customer based on their site configuration and what they have signed up for in agreeing to program participation. The custom event message 504 may explicitly state which assets (e.g. generators, lighting systems, etc.) will be affected and which specific assets are included or excluded according to the NOC database. For example, a customer may have told the NOC that their generator will be down for maintenance for a time period, and they would like to be excluded from the program during that time. Thus, the custom event message 504 may give the customer an opt-in or opt-out option either with respect to the entire event, or with respect to specific assets.

In addition, the NOC event notification message 503 starts a first event timer 505, which ends 506 when the event starts. At that time, a second event timer, the event clock, starts 507. Also in response to the NOC event notification message 503, an event data process begins 509. The event data process monitors and collects data in a data object associated with the event and may include some or all of the data available from the assets and associated sensors, which is available to the NOC and may also be provided to the customer and other third parties.

At the same time, an event control process begins 510 which actually controls the assets involved in the event by using business rules to reduce each participating facility's demand of electric power from the electric power distribution grid, such as by turning on generators, reducing lighting, resetting thermostat control thresholds, etc. For response smoothness and stability, the event-associated control of the assets may begin before the event actually does.

Before and during the scheduled event, there may be further messages 511 which provide additional information about the event or which may change the scope or length of the event. In response to such further messages 511, the system will receive and process them, and notify all affected customers. During the event, a participating customer may log in to the system and view details of their curtailment.

An external signal (such as an e-mail) notifies the NOC of the termination of the event. At that time, the event clock stops 508, the NOC sends commands to the local controllers to 512 restore the site to its initial state (turn off generator, restore lighting, etc.), and affected customers are notified that the event has terminated 513. The system then enters a reconciliation mode 514 in which the event data process ends, desired data transfers are verified, and system states are confirmed. Once the reconciliation mode completes, event process ends 515.

The embodiment just described is based on implementing event handling rules, so it is program-agnostic. Thus, a new workflow for a new curtailment program can be added without code changes. The foregoing description is relatively specific, and other embodiments may be implemented that could use any DER asset and/or any external signal.

Other specific applications of the strategies developed by this system include energy conservation, peak load reduction, load curtailment, and grid sellback opportunities. For example, some organizations can reduce a significant component of their annual energy expenses by as much as 33% by reducing the top 100 hours of peak demand. Among the benefits conferred by such embodiments, are significant energy savings (typically greater than 12% of total energy costs) with coordinated use of DER assets. Important real-time information is available to enable DER assets to respond quickly to market opportunities and to optimize the value of available energy assets. Reports are produced to inform customers about the savings resulting from such optimization strategies and to help improve system managers' understanding of their site's or sites' energy usage, patterns, and costs.

Other benefits include improved reliability of DER assets by regulating their operation, better return on investment including opportunities to capture new revenue streams, improved utility contracts based on aggregation of energy consumption and negotiation of bulk rates, and improved supply availability to power grids thereby improving system-wide reliability. With DG, it is not necessary that energy consumption behavior be changed, thereby offering a non-intrusive alternative to other demand or load management strategies. Outsourcing DG and other energy management services to networked third parties enables optimal energy management activities that can be almost undetectable to customers.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared) or other transmission techniques. The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method for controlling distributed energy resources, the method comprising:

receiving notification of an upcoming regional power distribution event;

determining a distributed energy resource affected by the upcoming event;

determining an optimal control threshold for controlling an affected distributed energy resource asset using facility conditions and/or electric grid conditions;

sending a first notification message to an affected distributed energy resource asset administrator to notify the distributed energy resource asset administrator of the event;

in response to the first notification message, initiating an event data process to monitor and collect data associated with the event and initiating an event control process utilizing the optimal control threshold to control the affected distributed energy resource asset during the event;

terminating the event control process at the end of the event; and terminating the event data process.

2. A method according to claim 1, wherein the receiving notification of an upcoming regional power distribution event includes receiving a request to reduce demand of electricity from the electric power distribution grid.

3. A method according to claim 2, wherein the receiving a request to reduce demand of electricity from the electric power distribution grid includes receiving a request to reduce demand of electricity from the electric power distribution grid according to a predefined program.

4. A method according to claim 3, wherein the predefined program identifies one or more distributed energy resource assets available to respond to the event.

5. A method according to claim 1, further comprising sending a second notification message to the distributed energy resource asset administrator, the second notification message identifying distributed energy resource assets affected by the event.

6. A method according to claim 5, wherein the second notification message provides means by which the distributed energy resource asset may opt to be excluded or included in the event.

7. A method according to claim 5, wherein the second notification message is sent based on the site configuration of the distributed energy resource asset.

8. A method according to claim 1, wherein sending a first notification message to an affected distributed energy resource asset administrator to notify the distributed energy resource asset administrator of the event initiates a first event timer which stops timing when the event starts.

9. A method according to claim 8, wherein a second event timer is initiated when the first event timer stops timing, and the second event timer stops timing upon receipt of an event termination signal.

10. A method according to claim 1, further comprising verifying data transfers associated with the regional power distribution event.

11. A method according to claim 1, further comprising confirming states associated with affected distributed energy resource assets.

* * * * *

UNITED STATES PATENT AND TRADEMARK OFFICE
CERTIFICATE OF CORRECTION

PATENT NO. : 7,333,880 B2 Page 1 of 1
APPLICATION NO. : 11/208029
DATED : February 19, 2008
INVENTOR(S) : David B. Brewster et al.

It is certified that error appears in the above-identified patent and that said Letters Patent is hereby corrected as shown below:

Col. 8, line 65
replace "event;"
with --upcoming event;--

Signed and Sealed this

First Day of April, 2008

JON W. DUDAS
*Director of the United States Patent and Trademark Office*